Aug. 5, 1969  D. W. HUSTED ETAL  3,459,472

MOTION-PICTURE FILM VIEWER

Filed Sept. 6, 1966  2 Sheets-Sheet 1

INVENTORS
DAVID W. HUSTED
JAMES A. HOLBROOK

BY Beaman & Beaman

ATTORNEYS

Aug. 5, 1969  D. W. HUSTED ET AL  3,459,472
MOTION-PICTURE FILM VIEWER
Filed Sept. 6, 1966  2 Sheets-Sheet 2
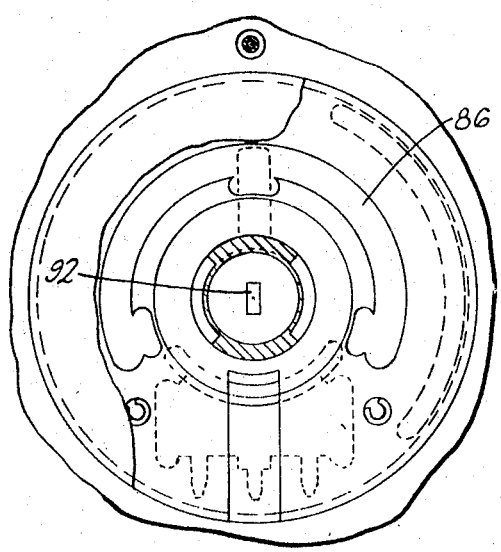
FIG. 3
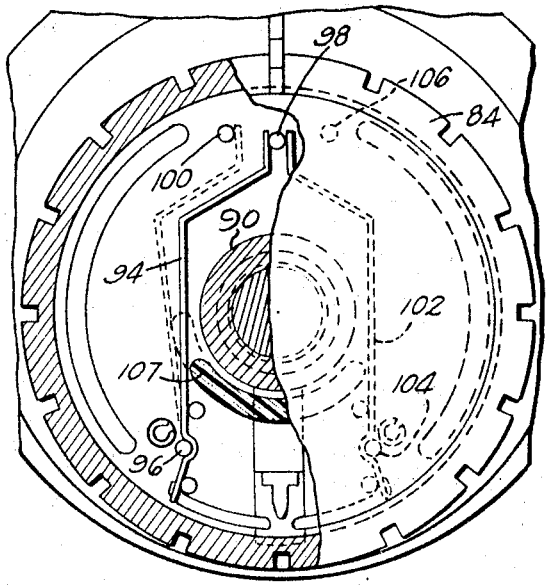
FIG. 4
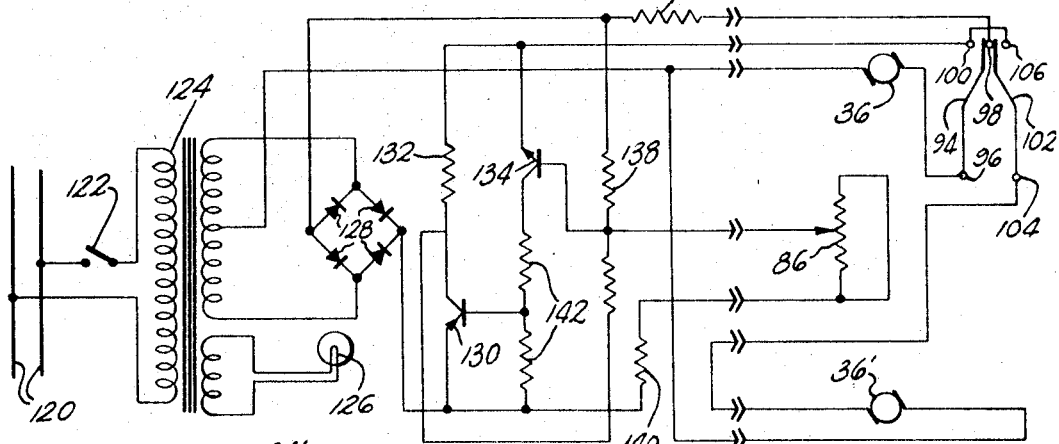
FIG. 7
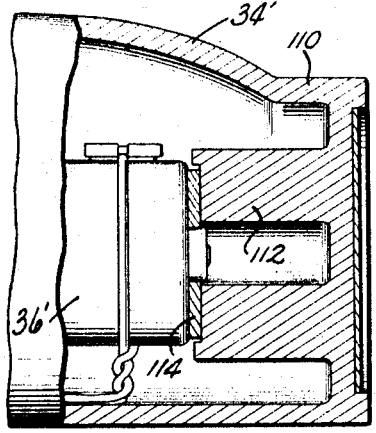
FIG. 5
FIG. 6
INVENTORS
DAVID W. HUSTED
JAMES A. HOLBROOK
BY Beaman & Beaman
ATTORNEYS United States Patent Office 3,459,472
Patented Aug. 5, 1969

3,459,472
MOTION-PICTURE FILM VIEWER
David W. Husted, 2731 Byington Blvd., and James A. Holbrook, 1503 E. Park Ave., both of Ann Arbor, Mich. 48103
Filed Sept. 6, 1966, Ser. No. 577,271
Int. Cl. G03b 1/00
U.S. Cl. 352—129                    9 Claims

ABSTRACT OF THE DISCLOSURE

Motion-picture film viewing apparatus of the type utilizing an internal light source and translucent back-lighted screen mounted upon a base having lateral sides from which extend reel supporting arms. Separate electric motors are mounted upon each of the reel supporting arms for rotating the reel spindle mounted upon each arm, and common control means mounted upon one of the arms for selectively controlling operation of the electric motors whereby the motion picture film may be moved through the viewer in either direction by the electric motors.

---

Figure 1:
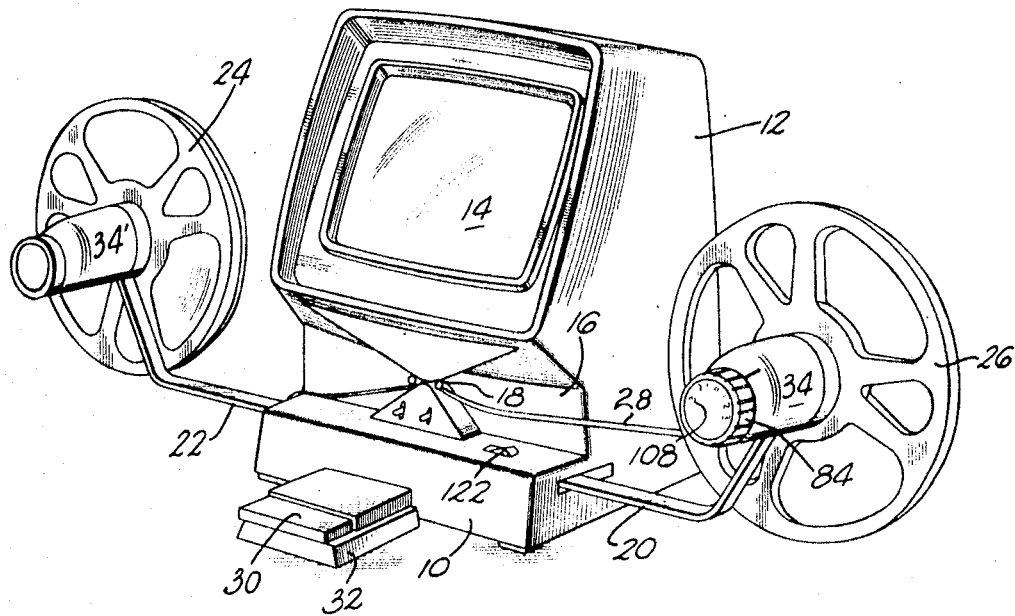

The invention pertains to apparatus for viewing photographic film and particularly relates to apparatus for projecting movie film for viewing or editing purposes.

Apparatus for viewing and editing motion picture film usually consists of a projection system using a ground glass screen which receives the projected image from the opposite side of the screen from which it is viewed. Such viewers include a gate in which the motion-picture film is received and the film image projected into the optical system. The film is mounted upon two reels which are supported on opposite sides of the film gate and screen. Normally, the reels are mounted upon arms and one reel is designated the rewind or supply reel and the other reel serves as a film take-up, or film-pulling reel. In the usual construction, rotatable spindles are mounted upon the arms which support the film reels and manually operated crank handles are used to rotate the spindles and reels. The crank handles are either directly connected to the spindles or geared thereto.

Manually cranked motion-picture film viewers and editors of the above described type are sometimes used to view the motion-picture film in its entirety when it is not desired to project the film upon a screen using a conventional projector. In such instances where it is desired to merely view the film, considerable cranking of the take-up reel is involved, and similar extensive cranking is required to rewind the film on the rewind reel. When using the viewer for film editing purposes, the operator will stop the film at the desired location, sever the film, remove that portion thereof which is to be removed, and splice the film. When using the viewer for editing purposes, continuous stopping and starting of the reels is involved, and it is often necessary to reverse the film and go forward slowly in order to make the splice at the desired frame. Thus, the operator will shift between cranking the take-up or rewind handles and often uses both hands to do the cranking.

An object of the invention is to provide a viewer and editor for motion-picture film wherein manual cranking and operation of the take-up and rewind reels is eliminated. Manual operation of the viewer in accord with the invention is eliminated by employing electric motor drive means to rotate the take-up and rewind reel spindles, and the motors are associated with the spindles in such a manner as to produce the most desirable operating characteristics while simplified control means for the motors is provided which permits both the reels to be operated from a single location.

Another object of the invention is to provide electric reel driving means for a motion-picture film viewer wherein electric motors are mounted adjacent the film reels and a concise arrangement of motors and speed reduction gearing is produced to provide an attractive and aesthetically acceptable appearance.

An additional object of the invention is to provide an electrically driven motion-picture film viewer utilizing direct current, reversible motors wherein the motor control is accurate, provides infinitely variable speed ranges, and produces good torque characteristics at all speeds.

Another object of the invention is to provide a motion-picture film viewer having electric motor driven take-up and rewind reel spindles wherein the electric motors are controlled from a single control knob which operates a potentiometer and reversing switches whereby rotation of the knob in one direction from a neutral position will energize one of the motors, while rotation of the control knob in the opposite direction from the neutral position, will control the other motor. Such operation in a motion-picture viewer is of definite advantage, in that the operator need not remove his hand from the control knob regardless of the direction of movement of the film to be produced.

A further object of the invention is to provide an electrically driven, motion-picture film viewer wherein separate electric motors are utilized with the take-up and rewind reel spindles and sensitive clutch means are employed to selectively interconnect the electric motor with its associated spindle only when the spindle is to be driven in a film-winding direction. Means are incorporated in the motor control circuit to insure that the motors will be disconnected from their associated spindles at all times except when the film is being wound thereby.

A further object of the invention is to provide an electrically driven, motion-picture film viewer wherein the electric drive mechanisms are so mounted and related to reel-supporting arms that a symmetric and pleasing appearance is produced.

Figure 2:
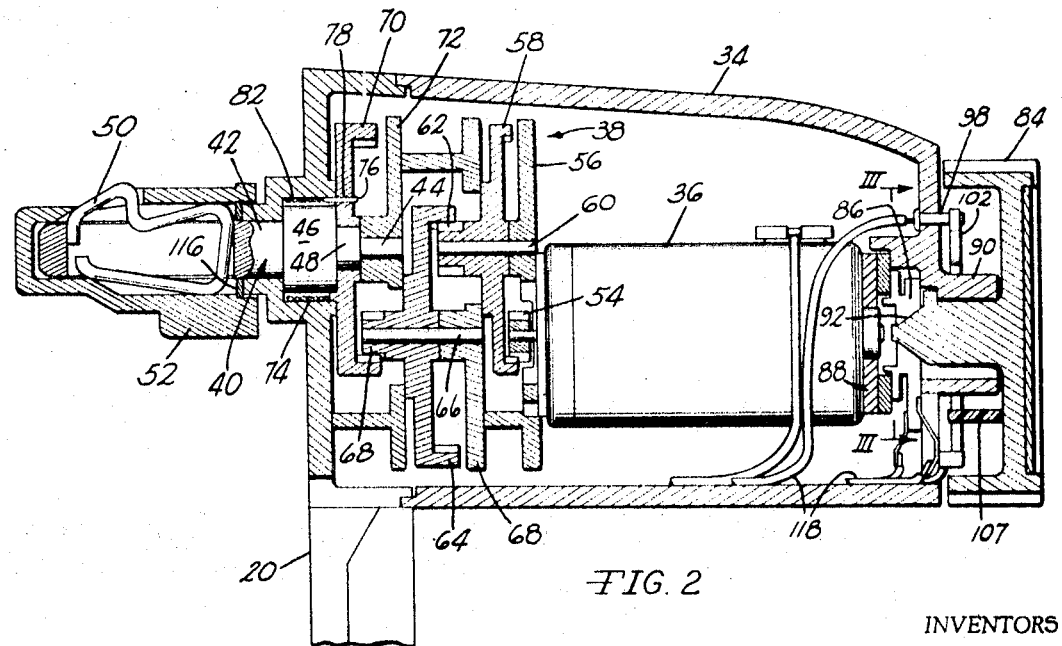

These and other objects of the invention will be apparent from the details and relationships of the components of an embodiment thereof as described in the following specification and accompanying drawings wherein:

FIG. 1 is a perspective view of a motion-picture viewer constructed in accord with the invention, FIG. 2 is a diametrical, elevational, sectional view through the take-up motor housing, spindle and control knob, FIG. 3 is an elevational, partial, sectional view of the motor control apparatus illustrating the potentiometer construction, as taken along section III—III of FIG. 2, FIG. 4 is an elevational, partly sectional view taken through the control knob illustrating the reversing switch mechanism, FIG. 5 is a detail, elevational, sectional view illustrating the rewind motor support in the rewind arm, FIG. 6 is an enlarged, detail, sectional, diametrical view taken through the take-up arm spindle illustrating the spring clutch in a driving relationship therewith, and FIG. 7 is a diagram of the motor control circuit.

The general arrangement of the components of a motion-picture viewer in accord with the invention will be appreciated from FIG. 1. A base 10 supports a vertically extending housing 12 having a translucent screen 14, such as of ground glass, mounted therein. The front portion of the housing is recessed at 16, and the projection gate 18 is located within this recess. The projection gate 18 includes a film sprocket reel coupled with the necessary optical apparatus required to project the image of a motion-picture film frame located within the gate to an optical system within the housing 12 which enlarges the image and projects the same upon the screen 14.

A pair of arms extend from the base 10. The arms 20 and 22 will normally be pivotally mounted upon the base and may be swung from a position along side the base to the extended or operating position shown in FIG. 1. The rewind or supply arm 22 is shown in FIG. 1 as rotatably supporting a supply reel 24. The take-up arm 20 is illustrated as supporting a take-up reel 26. The motion-picture film 28 extends between the reels and in the illustrated figure has just begun to be wound on the take-up reel 26. The motion-picture film 28 is received within the gate 18 and the arms 20 and 22 are so located, when in the operating position, that the reels 24 and 26 will be in alignment with the gate. Thus, film extending between the reels received within the gate is moved through the gate as the film is wound on one reel and fed from the other. As many similar components are employed with each arm, primed reference numerals will be employed with similar components where convenient for descriptive purposes.

Film splicing apparatus of a conventional nature is illustrated at 30 and may be mounted upon a support 32 which, when not used, may be pivoted underneath the base 10 to a storage position.

Each of the arms 20 and 22 is provided with a housing 34 affixed thereto which extends toward the operator. Within each housing is located a DC electric motor 36, a speed-reducing gear train, generally indicated at 38, and a reel-supporting spindle 40 is rotatably mounted in the arm in a selectively drivable relationship with the gear train, as will be later described.

The reel-supporting spindles 40 are identical in construction and include a bearing portion 42 and an end bearing portion 44 which associates with a gear train spacer plate. Intermediate the bearing portions 42 and 44 an enlarged, cylindrical, clutch spring, engageable portion 46 and a gear journal portion 48 are located. The outer portions of the spindles 40 include a motion-picture film reel-retaining clip 50 and the necessary sleeve 52 to permit a motion-picture film reel to be retained upon the spindle, yet be readily attachable and removable therefrom.

The electric motors 36 associated with each of the reel spindles are identical in construction, and are preferably of the twelve volt, direct current, permanent magnet type. The motors include an output gear 54, and the end of the motor nearest the spindle is supported upon a gear train spacer plate 56. The motor gear 54 meshes with an internal ring gear 58 rotatably mounted on shaft 60 supported in spacer plate 56. The integral pinion gear 62 of gear 58 meshes with an internal ring gear 64 rotatably mounted upon a shaft 66 which is supported in the spacer plate 68. The gear 64 includes an integral pinion gear 68 which meshes with the internal ring gear 70 rotatably mounted on the spindle gear journal portion 48. The spindle bearing 44 is supported in the spacer plate 72.

Clutching of the gear 70 to the spindle 40 occurs through a helical spring clutch 74. The spring clutch includes an inner end defined by an axially extending portion 76 received within a hole 78 formed in gear 70. The outer end of the spring 74 is formed with coils 80 which are of a diameter which causes the coils 80 to slidably, frictionally engage the cylindrical surface 82 defined in the associated arm 20, FIG. 2. The coils 80 engage the surface 82 with enough friction to cause the spring to wind into a reduced diametrical condition when the spring 74 is wound in a film-winding direction by the gear 70. This condition is illustrated in FIG. 6 where it will be noted that while the outer coils 80 will remain in engagement with the arm surface 82, the other coils of the spring will tightly grip the spindle portion surface 46 and establish a driving connection between the gear 70 and the spindle 40.

If the gear 70 is rotated in a direction opposite from a film-winding direction, the frictional engagement of the spring end coils 80 with the surface 82 will unwind the spring to increase the diameter thereof and declutch the gear 70 from the spindle 40. As will be later described, a biasing current is imposed on the electric motors 36 to maintain the spring clutches 74 in disengaged relationship to the associated spindle except when the gear is being rotated in a direction to wind the film upon the reel mounted on the associated spindle.

It will be appreciated that the electric motor 36 mounted on the take-up arm 20, and the spring 74 associated therewith, rotate in a driving direction which will rotate the reel 26 counterclockwise, FIG. 1, while the motor 36 and the spring clutch in arm 22 rotate the reel 24 in a clockwise direction. Thus, the motors 36 are wired to produce opposite directions of rotation and the spring clutches 74 are spiraled in different directions.

One hand control of both electric motors is highly desirable and is accomplished by means of a knob 84 rotatably mounted upon the right hand or take-up arm housing 34. To permit infinitely variable speed variation of the motors 36 when being energized to wind the film upon its associated reel, a small potentiometer 86 is located within the housing adjacent the end of the motor remote from the gear train 38. A motor mounting washer 88 is disposed immediately adjacent the outer end of the motor shown in FIG. 2, and the potentiometer is concentrically related to the housing journal 90 rotatably supporting the knob 84. The innermost extending portion 92 of the knob operates the potentiometer tap whereby rotation of the knob will vary the position of the tap with respect to the potentiometer resistance element, FIG. 3. The potentiometer 86 is of the type wherein positioning of the tap at the twelve o'clock position, FIG. 3, provides the greatest resistance. Positioning of the tap at the eleven o'clock or one o'clock position produces sufficient resistance to produce low speed operation of the respective motors and positioning of the tap at the four o'clock or eight o'clock positions produces minimum resistance for the highest speed rotation of the electric motors 36.

A reversing switch is also located adjacent the knob 86 for actuation thereby. The reversing switch includes a resilient leaf contact 94 supported upon terminal 96 for normal engagement with the contact 98. The contact 100 may be selectively engaged by the leaf 94. A second, similar leaf contact 102 is supported upon a terminal 104 for normal engagement with the contact 98. A contact 106 is located for selective engagement by the leaf 102. The knob 84 is formed with an inwardly extending, switch-operating projection 107 which is adapted to engage one of the contact leaves 94 or 102 when the knob is rotated from the off or neutral position shown in FIG. 4. For instance, rotating the knob 84 in the clockwise direction, FIG. 4, will cause the projection 107 to engage the contact leaf 94 shifting the upper end of the leaf from contact 98 to contact 100, establishing electrical continuity between the terminal 96 and the contact 100. Likewise, rotation of the knob 84 in a counter-clockwise direction deflects the leaf 102 to establish electrical continuity between the terminal 104 and the contact 106.

Indicia 108 may be formed on the knob 84 for comparison with a reference mark located on the housing to permit the operator to readily observe the position of the knob relative to the neutral position shown in FIG. 4.

FIG. 5 illustrates the support of the left motor 36' located within the rewind housing. As no electrical controls are mounted within the left housing 34', the housing end 110 includes a projection 112 which receives the motor mount washer 114 and supports the motor 36' in the manner illustrated. The housing end portion 110 is formed of a configuration similar to that of the knob 84, and would be of the same color as the knob whereby a symmetric appearance of the arms is achieved.

In order to prevent inertia forces from causing the film to spill from the reel supplying film, a spindle drag washer 116 is interposed between the arms and the associated spindle structure. The washers 116 provide enough frictional resistance to rotation of the spindle to prevent excessive inertia rotation of the reel, yet do not adversely interfere with the powered and unpowered operation of the spindle.

The plurality of conductors 118 associated with the housing 34, preferably, are received in a recess defined on the backside of the take-up arm 20 wherein the wires are attached to the motor control circuit components which are located within the housing 12.

The preferred circuit to be employed with the motion picture viewer in accord with the invention is shown in FIG. 7. 110 volt, AC power supply conductors are illustrated at 120, and a primary power switch 122 permits energizing of the transformer 124. The viewer lamp 126 is energized from the transformer and four silicon rectifiers 128 are connected in a full wave bridge to provide a 28 volt power supply. The voltage which is regulated by the potentiometer 86 for rotation of the selected motor in a forward or film-winding direction is supplied from the positive side of the power supply through the 2N554 transistor 130. A 5 ohm, 5 watt resistor 132 limits the maximum current and provides the positive feedback voltage which is proportioned to the current. A 2N4123 transistor 134 provides additional gain and serves as an emitter follower which tends to keep the motor voltage the same as that set on the potentiometer 86.

As it is desired that a reverse biasing rotation be imposed on the gear wheels 70 to insure the declutching of the springs 74 from their associated spindle when the associated motor is not energized in a film-winding direction, a reverse current of low intensity is imposed upon the electric motors 36 except when the motors are energized in a film-winding direction. Preferably, this low, reverse, biasing current is imposed upon the motors 36 whenever the switch 122 is closed, assuming the reversing switch to be in the neutral position shown in FIGS. 4 and 7. By assuring that the spindles 40 are declutched from their associated gear train as soon as the switch 122 is energized, threading of the take-up reel 26 can be easily accomplished, in that it may be desired to manually rotate the reel several degrees to align the reel film end holder with the film end, or make other preliminary initial adjustments.

The reverse direction current for imposing the small biasing force upon the motor gear train and spring clutch is supplied from the negative side of the bridge through a 40 ohm, 5 watt resistor 136 which is connected to the contact 98. A 2.7K resistor 138 is connected to the negative side of the power supply for providing the off characteristics on the potentiometer and a 270 ohm resistor 140 prevents excessive base current in the transistor 134 when the control is at the end of its potentiometer range wherein maximum flow through the potentiometer occurs. Two 100 ohm resistors 142 assure turning off the transistor 130 and prevent excessive power dissipation in the transistor 134.

The right, or take-up motor 36 is connected to the terminal 96 and the left, or rewind motor 36′ is connected to the terminal 104. The contacts 100 and 106 are connected to the positive control side of the circuit.

When the leaf contacts 94 and 102 are in the neutral position shown in FIGS. 4 and 7 and the main switch 122 is closed, the low reverse biasing current will be imposed upon both of the electric motors 36 and 36′, insuring that both spring clutches 74 will be disengaged from their associated spindles 40 and that the viewer may be easily threaded. Rotation of the knob 84 in a clockwise direction to wind the film on the reel 26 pivots the contact leaf 94 to interconnect terminal 94 and contact 100, as shown in dotted lines in FIG. 4, rotating the motor 36 in a film-winding direction, while the negative biasing current will remain imposed on the rewind motor 36′. The further the knob 84 is turned clockwise, the faster the motor 36 will run, as the resistance of the potentiometer is decreased. Likewise, rotation of the knob 84 from the neutral position in a counterclockwise direction will energize the rewind motor 36′, while maintaining the biasing reverse current on the take-up motor 36.

It will be appreciated that as both motors are controlled by the single knob 84, and as the speeds of the motors are, likewise, controlled by the knob, the operator is able to readily control the direction and velocity of movement of motion picture film through the viewer gate 18. By mounting a separate motor upon each of the arms 20 and 22, an electric drive is provided which is totally enclosed within its own housings and, as the electric wiring may be readily concealed, an attractive appearance is attained. The concise arrangement of the motor and gear train associated with each spindle prevents this structure from detracting from the appearance and minimizes the size of the components. The electric motor control disclosed provides good torque characteristics, even at low speeds and, by imposing a biasing current on the electric motors, except when the motors are energized in a film-winding direction, insures that the reel spindles will be declutched from their associated gear train except when desired.

It is appreciated that various modifications to the inventive concept may be apparent to those skilled in the art without departing from the spirit and scope thereof, and it is intended that the invention be defined only by the scope of the following claims:

1. A motion-picture film viewer comprising, in combination, a supply reel support, a take-up reel support, film projecting means located intermediate said supports, a reel spindle rotatably mounted upon each of said supports adapted to receive a film reel, an electric motor mounted upon each of said supports adapted to be drivingly connected to the associated reel spindle, clutch means interposed between each of said motors and the associated spindle, means clutching said motors to the associated spindle only upon said motors being energized to rotate in a film-winding direction, and control means controlling operation of each of said motors.

2. In a motion-picture film viewer as in claim 1 wherein said clutch means comprise helical springs having first and second ends, a spring circumscribing each spindle, one end of said springs being connected to the associated motor for winding said spring in a spring radially contracting direction to establish a driving connection with the associated spindle upon the associated motor being energized in a film-winding direction, the other end of said spring slidably, frictionally engaging fixed support means.

3. In a motion-picture film viewer as in claim 2 wherein said electric motors are reversible, said control means imposing a small reversing current upon the motor associated with the spindle unwinding film to bias the associated spring in an unwound condition insuring declutching of the spindle unwinding film from its associated motor.

4. A motion-picture film viewer comprising, in combination, a base having lateral sides, motion picture film projecting means mounted upon said base, said projecting means including a light source, a film-receiving gate and a back lighted translucent screen, a pair of elongated arms mounted on said base, an arm extending from each lateral side of said base, said arms being disposed on opposite sides of said film-receiving gate, a reel spindle rotatably supported on each of said arms, a housing mounted on each of said arms adjacent the associated spindle, an electric motor mounted within each of said housings, speed reduction gearing mounted within each of said housings having input and output shafts, said input shafts being connected to and driven by the adjacent motor and the output shaft being drivingly connected to the adjacent reel spindle, and common control means controlling energization of said motors.

5. In a motion-picture film viewer as in claim 4 wherein said control means includes switch means mounted upon one of said arms adjacent to the housing defined thereon.

6. In a motion-picture film viewer as in claim 5 wherein said switch means includes a knob rotatably mounted relative to said adjacent housing for rotation in clockwise and counterclockwise directions relative to a neutral position, rotation of said knob in the clockwise direction from said neutral position energizing one of said motors and rotation of said knob in the counterclockwise direction from said neutral position energizing the other of said motors.

7. In a motion-picture film viewer as in claim 4 wherein said arms are pivotally mounted on said base pivotable between an operative position transverse to the associated base lateral side and an inoperative position alongside the associated base lateral side.

8. In a motion-picture film viewer as in claim 7 wherein said housings are generally cylindrical in configuration having an axis in substantial alignment with the axis of the associated spindle.

9. In a motion-picture viewer as in claim 8 wherein said control means comprises a switch knob rotatably mounted upon one of said housings in substantial axial alignment with the axis thereof and at the end of the associated housing remote from the associated spindle.

References Cited
UNITED STATES PATENTS

| | | | |
|---|---|---|---|
| 1,468,499 | 9/1923 | Frangos | 352—124 |
| 2,412,551 | 12/1946 | Pratt et al. | |
| 2,905,050 | 9/1959 | Castedello et al. | |
| 3,138,057 | 6/1964 | Castedello et al. | |

JULIA E. COINER, Primary Examiner

U.S. Cl. X.R.

352—124, 173

PO-1050
(5/69)

UNITED STATES PATENT OFFICE
CERTIFICATE OF CORRECTION

Patent No. 3,459,472          Dated  August 5, 1969

Inventor(s) David W. Husted and James A. Holbrook

It is certified that error appears in the above-identified patent and that said Letters Patent are hereby corrected as shown below:

Column 1, line 5, after "48103" the following should be inserted---assignors to Baia Corporation, Jackson, Michigan, a corporation of Michigan---

SIGNED AND
SEALED
FEB 17 1970

(SEAL)
Attest:

Edward M. Fletcher, Jr.
Attesting Officer

WILLIAM E. SCHUYLER, JR
Commissioner of Patents